C. E. MISER.
AUTOMATIC CYLINDER COCK.
APPLICATION FILED JUNE 26, 1908.

913,965.

Patented Mar. 2, 1909.
2 SHEETS—SHEET 1.

WITNESSES:—
A. W. Heape
R. L. Wallace

INVENTOR.
Charles E. Miser.
By Harry A. Wallace
ATTORNEY.

C. E. MISER.
AUTOMATIC CYLINDER COCK.
APPLICATION FILED JUNE 25, 1908.

913,965.

Patented Mar. 2, 1909.
2 SHEETS—SHEET 2.

WITNESSES:
A. W. Heaps
R. L. Wallace

INVENTOR.
Charles E. Miser.
BY Harry De Wallace
ATTORNEY.

UNITED STATES PATENT OFFICE.

CHARLES E. MISER, OF WATERTOWN, NEW YORK.

AUTOMATIC CYLINDER-COCK.

No. 913,965.    Specification of Letters Patent.    Patented March 2, 1909.

Application filed June 25, 1908. Serial No. 440,240.

*To all whom it may concern:*

Be it known that I, CHARLES E. MISER, a citizen of the United States, residing at Watertown, in the county of Jefferson and State of New York, have invented certain new and useful Improvements in Automatic Cylinder-Cocks, of which the following is a specification.

This invention relates to improvements in cylinder cocks, designed for use in connection with steam engines generally, and the invention relates particularly to a cock for employment on the cylinders of portable and stationary engines, for the purpose of automatically draining the water produced by the condensation of the steam.

The object of the invention is to provide a simple, compact, durable and reliable self-acting cylinder cock, particularly adapted for draining water from the cylinders of locomotives, and wherein the construction and arrangement of the parts are such that, the device will perform its work effectively and readily, without attention or care, and will stand considerable wear and abuse and not get out of order.

The present invention consists principally of a one-part body or casing of peculiar form, capable of being connected to the cylinders of an engine with slight work and expense.

The invention further consists of a petcock or valve comprising a metallic ball or sphere disposed in the said casing and capable of being seated automatically to prevent the escape of steam from the cylinder while the engine is working, and adapted to gravitate away from its seat, for the purpose of allowing the water produced by the condensing of the steam, to escape from the cylinder instantly upon the shutting off of the steam pressure. The said ball-valve being entirely free from mechanical connections and entirely automatic in its operations both for opening and closing the cock. And the invention further consists of simple means for opening or unseating the valve or cock by hand in case of emergency.

To this end the invention consists in the combination, construction and arrangement of the parts of the cylinder cock as hereinafter fully described, illustrated by the accompanying drawings, and then pointed out in the claims.

Figure 1:
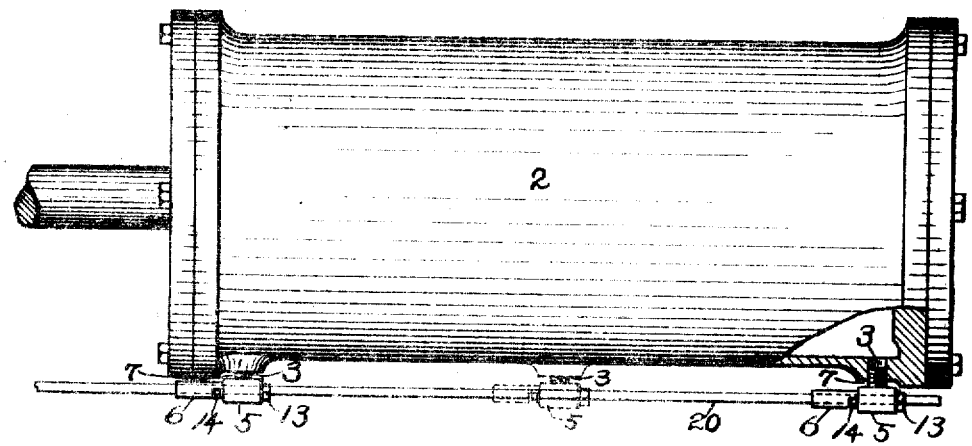
Figure 2:
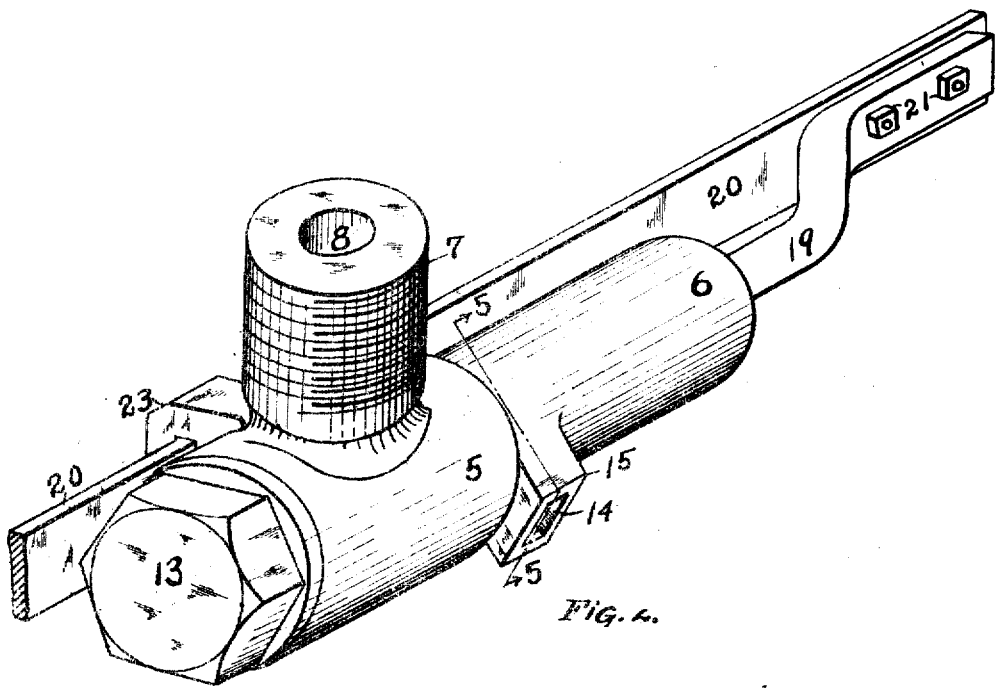
Figure 3:
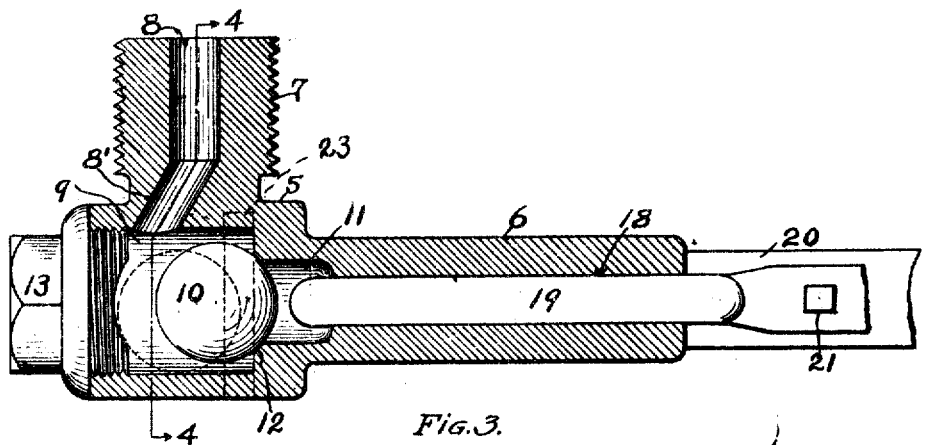
Figure 6:
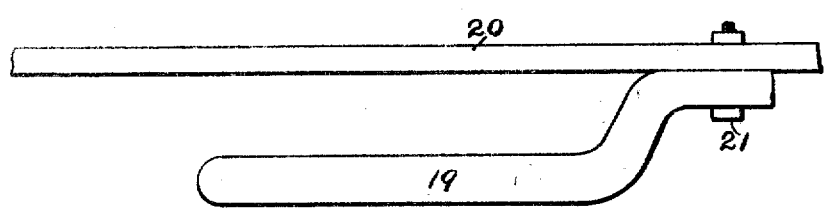
Figure 4:
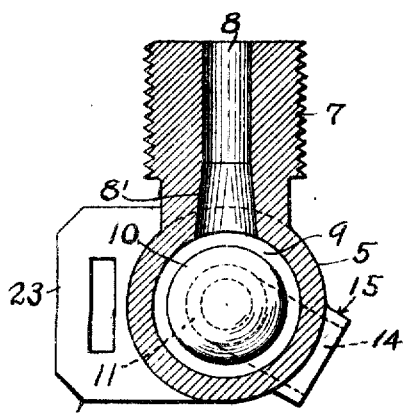
Figure 5:
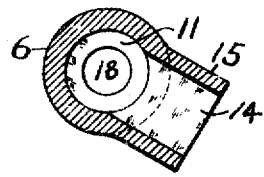

Referring to the drawings, Figure 1 is a right side view of the left cylinder of a locomotive, showing a number of my automatic cylinder cocks operatively applied to the same. Fig. 2 is a perspective view, showing the cylinder cock complete; also showing the plunger and operating-rod. Fig. 3 is a central vertical longitudinal section, showing the construction and arrangement of the principal parts of the cock; also showing respectively, by full and dotted lines, the position of the spherical valve in closed and open position; also showing the plunger in relation to the ball. Fig. 4 is a cross-section substantially as on line 4—4 of Fig. 3. Fig. 5 is a detail cross-section substantially on line 5—5 of Fig. 2; showing the arrangement of the exhaust port in relation to the exhaust chamber. Fig. 6 is a detail view of the plunger and a portion of the operating-rod.

Similar numerals of reference are assigned to corresponding parts throughout the several views.

In all steam engines after they have been in operation for a time, and the steam pressure is shut off, a certain amount of the vapor remains in the cylinders, which in a short time condenses and forms water. In order to insure the efficient and safe working of such an engine, the cylinders must be kept free from water resulting from the cooling and condensing of the steam, and to this end the cylinders of all steam engines are equipped with pet or drain cocks, which are applied to the underside of the cylinders, usually at or near the ends, so that the water may gravitate into the cocks and then be discharged in a suitable manner to the atmosphere. Heretofore, the cylinder cocks employed for this purpose, particularly in connection with the cylinders of locomotives, generally consisted of a simple reciprocating check-valve, which required the personal and frequent attention and care of the engineer, who was obliged to open the cock and drain the cylinders each time before he started up the engine, to prevent the straining or bursting of the cylinder heads.

It is an object of the present invention to provide a cylinder cock for employment in connection with both portable and stationary steam engines, which will automatically discharge the water produced by the condensation of the steam, when the engine is not in operation. The construction and arrangement of the parts of the device being such that, the cock opens instantly without any assistance, when the steam pressure is shut off and remains in that condition until closed by the pressure when it is again turned onto the cylinders. The following is a detail description of my invention:

In the accompanying drawings, 2 represents a cylinder, which for the purpose of illustrating my invention preferably represents one of the steam cylinders of a locomotive, which may be constructed in any suitable manner, and provided with a piston and other parts common to a steam cylinder. 3 represents a number of threaded ports or openings in the bottom of the cylinder for carrying off the water. These ports are usually disposed at or near the ends of the cylinder, and in some cases, a like port is located midway between the ends of the cylinder, as shown by dotted lines in Fig. 1.

My automatic cylinder cock comprises a chambered body, preferably made of brass, cast in one part, as shown, and having an enlarged cylindrical portion 5, forming the valve casing, and an elongated integral neck 6, formed concentric to the casing 5. 7 represents an integral threaded portion formed on the upper side of the casing 5, by means of which the cock is detachably connected to ports 3 of the cylinder. The threaded connection 7 is bored out centrally to form a free and unrestricted port 8, through which the steam and water may pass from the cylinder into a cylindrical valve chamber 9 of the casing 5. 10 represents a free ball or spherical valve, preferably solid and made of brass or bronze, which is disposed in the chamber 9, as shown in Figs. 3 and 4. 11 represents a contracted cylindrical chamber formed partly in the casing 5, and partly in neck 6 and connecting to the inner end of, and disposed concentric to, the valve chamber 9; the mouth of chamber 11 being slightly beveled or countersunk to form an annular seat 12 for the ball. The outer end of the valve chamber 9 is tightly closed by a threaded cap-nut or plug 13, which is provided for the purpose of inserting the ball, and for cleaning out or repairing the cock.

The ball chamber 9 having a larger diameter than the exhaust chamber 11, and the two chambers being concentric, the ball 10 when in released or idle position, as indicated by the dotted lines in Fig. 3, rests upon the floor of chamber 9 in such manner that its horizontal axis is slightly eccentric to or below the axial plane of said chambers. From this position the ball must be lifted bodily, free from the floor of chamber 9, in order to reach and enter its seat, to prevent the passage of steam from chamber 9 into chamber 11, during the working of the engine. In order to facilitate the seating of valve 11 in a ready and positive manner, by the force of the steam pressure, the inlet port 8 is inclined outwardly at its lower end, as at 8', so that the force of the pressure entering chamber 9 from the cylinder may at all times be directed against the rear side of the ball, for the purpose of driving and holding the ball in seat 12. To give the pressure coming through port 8 a greater purchase on the ball, a cavity is formed in the inner face of plug 13 concentric to chambers 9 and 11, while the ball when in its idle position on the floor of its chamber lies in a lower plane. When the ball is in this position an open space occurs between the upper rear side of the ball and plug 13 (as shown in Fig. 3) which permits the steam to pass between the ball and the plug, to thereby lift and force the ball forward into its seat, where it will be held until the pressure is relaxed or shut off entirely. By this arrangement, whether the ball is unseated or seated, the force of the pressure is constantly exerted against the rear side of the ball. As long as the pressure overbalances the weight of the ball, the latter will remain seated and prevent escape of either steam or water from chamber 9 to chamber 11. To discharge the water which flows from the cylinder into chambers 9 and 11, after the steam pressure is shut off, and the ball 10 gravitates away from seat 12, I provide a normally open exhaust port, preferably in the form of an oblong passage 14, disposed at an angle of about 45°. The inner end of this port connects with chamber 11 to the right of seat 12, and the outer end terminates in a projecting nozzle 15 which is formed integrally with the neck 6. The ports 14 are disposed in such manner as to completely drain chamber 11, (see Figs. 4 and 5), and when the cylinder cocks are applied to a locomotive, the water received from the cylinders is discharged underneath the engine instead of outwardly away from the track as heretofore. To this end it is therefore preferred in constructing my automatic cylinder cocks for use on locomotives, to make them right and left handed. The neck or laterally extending portion 6 of the body, is bored out centrally, as at 18, to operatively receive a reciprocating plunger 19, the inner end of which is rounded and extends some distance into the cavity 11, in position to unseat ball 10, when moved inwardly a short distance. The plunger 19 is preferably made as shown in Figs. 2, 3 and 6, and rigidly secured to the sides of an operating-bar or rod 20, by a series of bolts or screws 21. The bar 20 is held in operative position, and has free play in a slotted lug 23, which is formed integrally with the casing 5. The plunger is bent or formed at a suitable angle to bring its inner or free end parallel to the bar 20, and the slotted lug 23 serves as a guide for rod 20 to hold the plunger in true alinement to the valve case. In practice, one bar 20 usually supports two or more of the plungers 19, employed for operating as many cylinder cocks (see Fig. 11) and this bar connects with an operating-rod (not shown), which extends back into the cab within convenient reach of the engineer. The object of this latter provision is to afford a means by which the engineer may unseat the ball 10, for the purpose of draining the cylinders in case of emergency, such as the flooding of the boiler. Ordinarily during the normal operation of the engine, no attention or care need be given to the cylinder cocks, as they are entirely automatic in their operation both for opening and closing the discharge port. When the steam pressure is in the cylinders, the port 8 being normally open, as shown in the drawings, the pressure will force and hold the ball 10 against its seat 12, and thus prevent any waste or escape of steam to the atmosphere through exhaust port 14. As soon as the steam pressure is shut off from the cylinders, as by the closing of the throttle, the ball-valve, by its own weight and owing to the position and arrangement of seat 12 in relation to the floor of chamber 9, will gravitate away from the mouth of chamber 11, and roll outwardly against the plug 13, where it will remain at rest on the floor of chamber 9, as illustrated by the dotted lines in Fig. 3. As soon as the ball recedes from its seat, any water that results from the condensation of the steam, will gravitate from the lowest point in the cylinder, through port 8 into chamber 9, thence pass into chamber 11, and be discharged or wasted through the port 14.

It is obvious that some changes or modifications may be made in the parts without departing from the spirit of my invention and I therefore do not wish to restrict myself to the precise construction and arrangement of the same as herein shown and described.

Having thus described my invention, what I claim as new and desire to secure by Letters Patent, is—

1. A cylinder cock, comprising a cylindrical body having a plurality of concentric chambers of unequal diameter and length, an inlet port to connect the larger chamber with the interior of a steam cylinder, an outlet port to drain the smaller chamber, and a spherical valve disposed in the larger chamber adapted to prevent or permit the passage of steam and water from one chamber to the other.

2. An automatic cylinder cock, comprising a casing having a number of concentric chambers connecting with each other, and having a threaded neck for connecting said cock to a steam cylinder, a port for the passage of steam and water from the cylinder through the threaded neck into the first chamber, a free ball-valve disposed in said first chamber, adapted when operated by the steam pressure to prevent the steam from entering the second chamber, and adapted when the steam pressure is shut off to gravitate away from the mouth of said second chamber to allow water to pass from the cylinder and said first chamber into said second chamber, a normally open port connecting with said second chamber adapted to carry the water away from said chamber, and a plunger operatively fitting said casing and disposed concentric to said chambers for unseating said spherical valve by hand, in case of emergency.

3. An automatic cylinder cock, comprising a cylindrical body capable of being connected to the cylinder of a steam engine by means of a tubular neck, a cylindrical valve-chamber in said body disposed beneath and connecting with said tubular neck, an exhaust-chamber in said body disposed concentric to said valve-chamber, the said exhaust-chamber having a smaller diameter than the valve-chamber and having its mouth beveled to form an annular seat, a free ball valve in said valve-chamber, the said ball having a larger diameter than said exhaust-chamber and adapted to be forced and held into the seat by the steam perssure, thereby to prevent the passage of steam from the valve-chamber into the exhaust-chamber, the said ball adapted to gravitate away from its seat to permit the free passage of water from the cylinder into said exhaust-chamber immediately the steam pressure is shut off, and a port to drain the water from said exhaust-chamber.

4. An automatic pet-cock, comprising a hollow cylindrical casing having a threaded neck for connecting the casing to a steam cylinder, the hollow space in said casing being continuous and consisting of a valve-chamber and an exhaust-chamber arranged concentric to each other, the mouth of said exhaust-chamber being formed into an annular valve-seat, a port to connect the valve-chamber with the interior of the cylinder, a port to drain the exhaust-chamber, a free ball-valve disposed in the valve-chamber adapted to close the mouth of said exhaust-chamber automatically upon the charging of the cylinder and said valve-chamber with steam pressure, and adapted to gravitate away from the mouth of said exhaust-chamber automatically upon the shutting off of the said pressure, and a plunger disposed in said casing concentric to said valve-seat for unseating the ball-valve by hand in case of emergency.

5. The combination with a steam cylinder having a series of drainage ports in the bottom thereof, of a series of automatic pet-cocks adapted for connection with the cylinder by means of said ports, each pet-cock comprising a casing provided with a number of concentric cylindrical chambers, an unrestricted inlet port to connect one of said chambers with the interior of the cylinder, a normally open exhaust-port to drain the second chamber, an annular valve-seat formed between said chambers, and a free spherical valve disposed in said casing between said inlet port and said seat, adapted when acted upon by the steam pressure to be carried and held in said seat to prevent the passage of steam from the first to the second chamber, the said valve adapted to be unseated by the force of gravity when the steam pressure is shut off, thereby to permit the water produced by the condensation of the steam in the cylinder to be discharged through said exhaust-port.

In testimony whereof I affix my signature in presence of two witnesses.

CHARLES E. MISER.

Witnesses:
 EDGAR V. BLOODOUGH,
 W. S. SPRAGUE.